(12) United States Patent
Haupt et al.

(10) Patent No.: US 12,551,534 B2
(45) Date of Patent: Feb. 17, 2026

(54) THERAPEUTIC USES OF TIRZEPATIDE

(71) Applicant: Eli Lilly and Company, Indianapolis, IN (US)

(72) Inventors: Axel Haupt, Zionsville, IN (US); Masahiro Murakami, Carmel, IN (US); Jeffrey Scott Riesmeyer, Fishers, IN (US)

(73) Assignee: ELI LILLY AND COMPANY, Indianapolis, IN (US)

( * ) Notice: Subject to any disclaimer, the term of this patent is extended or adjusted under 35 U.S.C. 154(b) by 725 days.

(21) Appl. No.: 17/795,972

(22) PCT Filed: Jan. 22, 2021

(86) PCT No.: PCT/US2021/014535
§ 371 (c)(1),
(2) Date: Jul. 28, 2022

(87) PCT Pub. No.: WO2021/154593
PCT Pub. Date: Aug. 5, 2021

(65) Prior Publication Data
US 2023/0355719 A1 Nov. 9, 2023

Related U.S. Application Data

(60) Provisional application No. 62/967,867, filed on Jan. 30, 2020.

(51) Int. Cl.
*A61K 38/26* (2006.01)

(52) U.S. Cl.
CPC .................................. *A61K 38/26* (2013.01)

(58) Field of Classification Search
CPC ..................................................... A61K 38/26
See application file for complete search history.

(56) References Cited

U.S. PATENT DOCUMENTS

| | | | |
|---|---|---|---|
| 9,474,780 B2 | 10/2016 | Bokvist et al. |
| 10,278,923 B2 | 5/2019 | Nielsen et al. |
| 11,357,820 B2 | 6/2022 | Corvari et al. |
| 11,918,623 B2 | 3/2024 | Corvari et al. |
| 12,295,987 B2 | 5/2025 | Alsina-Fernandez et al. |
| 12,343,382 B2 | 7/2025 | Benson et al. |
| 2004/0266683 A1 | 12/2004 | Hathaway et al. |
| 2009/0137466 A1 | 5/2009 | Anderson et al. |
| 2010/0029554 A1 | 2/2010 | Ghosh et al. |
| 2013/0053317 A1 | 2/2013 | Jucker et al. |
| 2013/0065828 A1 | 3/2013 | Ruus et al. |
| 2016/0151461 A1 | 6/2016 | Shannon |
| 2020/0023040 A1 | 1/2020 | Benson et al. |
| 2022/0135639 A1 | 5/2022 | Coffin et al. |

FOREIGN PATENT DOCUMENTS

| | | |
|---|---|---|
| WO | 2013164483 A1 | 11/2013 |
| WO | 2014005858 A1 | 1/2014 |
| WO | 2015067715 A2 | 5/2015 |
| WO | 2020/261205 A1 | 12/2020 |
| WO | 2022/271611 A1 | 12/2022 |

OTHER PUBLICATIONS

Bizino, M. et al., Cardiovascular Diabetology, "Effect of liraglutide on cardiac function in patients with type 2 diabetes mellitus: randomized placebo-controlled trial", Apr. 2019, vol. 18:55, 12 pages (Year: 2019).*
American Heart Association, "What is Cardiovascular Disease", last reviewed Jan. 10, 2024, available at https://www.heart.org/en/health-topics/consumer-healthcare/what-is-cardiovascular-disease# (Year: 2024).*
American Heart Association, "Ejection Fraction Heart Failure Measurement", last reviewed May 30, 2025, available at https://www.heart.org/en/health-topics/heart-failure/diagnosing-heart-failure/ejection-fraction-heart-failure-measurement# (Year: 2025).*
Del Olmo-Garcia, M. et al., Journal of Diabetes Research, "GLP-1 Receptor Agonists and Cardiovascular Disease in Patients with Type 2 Diabetes", 2018, 12 pages (Year: 2018).*
Scheen, Andre, Diabetes & Metabolism, "GLP-1 receptor agonists and heart failure in diabetes", 2017, vol. 43, pp. 2S13-2S19 (Year: 2017).*
Temporelli, Pier Luigi, "European Heart Journal Supplements, Role of glucagon-like peptide-1 agonists in obesity and heart failure with preserved ejection fraction", 2024, vol. 26, supplement 1, i127-i130 (Year: 2024).*
International Search Report of the International Searching Authority pertaining to International Application No. PCT/US2021/014535; Date of Mailing: Jul. 9, 2021; 7 pages.
Written Opinion of the International Searching Authority pertaining to International Application No. PCT/US2021/014535; Date of Mailing: Jul. 9, 2021; 6 pages.
Bastin et at , Dual GIP-GLP1-Receptor Agonists In The Treatment Of Type 2 Diabetes: A Short Review On Emerging Data And Therapeutic Potential Diabetes Metab Syndr Obes. 2019, vol. 12, p. 1973-1985. Entire documentation especial.y Abstract; p. 1976, Fig 1; p. 1977. Fig 2; p. 1979, Table 1; and p. 1981, col. 2, 'ower para and Table 2.
Coskun at at., LY3298176, a novel dual GIP and GLP-1 receptor agonist for the treatment of type 2 diabetes mellitus: From discovery to clinical proof of concept. Mol Metab. 2018, vol. 18, p. 3-14. Entire documentation especially Abstract; and p. 6, Fig 1.
Mathiesen et al., The Eects of Dual GLP-1/GIP Receptor Agonism on Glucagon Secretion—A Review Int J Mol Sal 2019, vol. 20(17): 4092. PDF File. p. 118. Abstract; p. 8, pare 5 and last para; p. 9; and p. 10, para 2.

(Continued)

*Primary Examiner* — Bahar Craigo
(74) *Attorney, Agent, or Firm* — Parker D. McCrary

(57) ABSTRACT

The present invention relates to methods for treating, preventing or delaying disorders relating to cognition, such as cognitive decline, cognitive impairment or dementia. The present invention also relates to method for treating, preventing or delaying heart failure, such as heart failure with preserved ejection fraction (HFpEF) or heart failure with reduced ejection fraction (HFrEF).

8 Claims, No Drawings

Specification includes a Sequence Listing.

(56) References Cited

OTHER PUBLICATIONS

Saedi at al., Diabetes mellitus and cognitive Impairments. World J Diabetes 2016, vol. 7(17), p. 412-422 Abstract; p. 412, col. 2, last para, p. 413, col. 2, para 5 and last para; p. 415, col. 1, para 3; and p. 416, col. 1, para 4.
Willard at at., Tirzepatide is an imbalanced and biased dual GIP and GLP-1 receptor agonist. JCI Insight Sep. 2020, vol. 5(17): e140532 PDF File: p. 1-16 Entire documentation especially Abstract.
Frias, at at., "Efficacy and safety of LY3298176, a novel dual GIP and GLP-1 receptor agonist, in patients with type 2 diabetes: a randomised, placebo-controlled and active comparator-controlled phase 2 trial", The Lancet, 2018, vol. 392, p. 2180-2193.
Mansur, et al., "Cognitive dysfunction and metabolic comorbities in mood disorders: A repurposing opportunity for glucagon-like peptide 1 receptor agonists?" Neuropharmacology, Elsevier, 2018, 9 pages.
Aggarwal, Rahul, et al., "Effect of sotagliflozin on major adverse cardiovascular events: a prespecified secondary analysis of the SCORED randomised trial", The Lancet, Apr. 2025, vol. 13, 321-333.
Baser, Onur, et al., "The association between weight loss medications and cardiovascular complications", The Obesity Society, Wiley, 2024, 32, 1401-1409.
Borlaug, Barry A., et al., "Effects of tirzepatide on circulatory overload and end-organ damage in heart failure with preserved ejection fraction and obesity: a secondary analysis of the SUMMIT trial", Nature Medicine, Feb. 2025, vol. 31, 544-551.
Extended EP Search Report, EP 21748068.0, mailed date Jan. 30, 2024, 21 pages.
Holscher, Christian, "Novel dual GLP-1/GIP agonist show neuroprotective effects in Alzheimer's and Parkinson's disease models", Neuropharmacology, Elsevier, 2018, 251-259.
NCT03861052: Clinical Study Protocl Amendment Version (a) I8F-JE-GPGO A Phase 3 Study of Tirzepatide Monotherapy Compared to Dulaglutide 0.75 mg in Patients with Type 2 Diabetes Mellitus (SURPASS J-mono) Jan. 17, 2019, 83 pages.
Packer, Milton, et al., "Tirzepatide for Heart Failure with Preserved Ejection Fraction and Obesity", The New England Journal of Medicine, Jan. 30, 2025, vol. 392 No. 5, 427-437.
Rosenstock, Julio, et al., "Efficacy and Safety of a novel dual GIP and GLP-1 receptor agonist tirzepatide in patients with type 2 diabetes", The Lancet, vol. 398, Jul. 10, 2021, 143-155.
Saglietto, Andrea, et al., "Glucagon-like peptide-1 receptor agonist semaglutide reduces atrial fibrillation incidence: A systematic review and meta-analysis", Wiley, May 2024, 1-10.
Shi, Lijuan, et al., "A Novel Dual GLP-1/GIP agonist alleviates cognitive decline by re-sensitizing insulin signaling in the Alzheimer icv. STZ rat model", Behavioural Brain Research, Elsevier, 2017, 65-74.
Verma, Subodh, et al., "Atrial Fibrillation and Semaglutide Effects in Obesity-Related Heart Failure With Preserved Ejection Fraction", Journal of The American College of Cardiology, 2024, vol. 84, No. 17, 1603-1614.
Zhang, Hong-Da, et al., "Semaglutide for the prevention of atrial fibrillation: A systematic review and meta-analysis", Diabetes & Metabolic Syndrome: Clinical Research & Reviews, Elsevier, Jun. 2024, 1-9.
McMurray, J.J.V., et al., "Dapagliflozin in Patients with Heart Failure and Reduced Ejection Fraction", The New England Journal of Medicine, vol. 381, No. 21, Nov. 21, 2019, 1995-2008.
Nguyen, T. Dung, et al., "GLP-1 Improves Diastolic Function and Survival in Heart Failure with Preserved Ejection Fraction", Journal of Cardiovascular Translational Research, 2018, 11, 259-267.
Oyama, J., et al., "Incretin Therapy and Heart Failure", Official Journal of the Japanese Circulation Society, vol. 78, Apr. 2014, 819-824.
Sokos, G.G., et al., "Glucagon-Like Peptide-1 Infusion Improves Left Ventricular Ejection Fraction and Functional Status in Patients With Chronic Heart Failure", Journal of Cardiac Failure vol. 12 No. 9 2006, 694-699.

\* cited by examiner

THERAPEUTIC USES OF TIRZEPATIDE

The present invention relates to the field of medicine. Provided are methods relating to treating, preventing, or delaying disorders relating to cognition, such as cognitive decline, cognitive impairment or dementia. Provided are methods relating to treating, preventing, or delaying heart failure.

Patients with type 2 diabetes mellitis (T2DM) frequently suffer from a variety of comorbidities, including cognitive issues such as cognitive decline, cognitive impairment or dementia. People with diabetes are 1.5 to 2 times more likely than unaffected people to experience cognitive decline, minimal cognitive impairment or dementia. This relationship is independent of other risk factors for cognitive dysfunction and accounts for a prevalence of 13% in people with diabetes aged 65-74 years and 24% in people aged 75 years or older. No single cause has been identified for the high risk of cognitive dysfunction in people with diabetes. The possibility that certain diabetes treatments, including glucagon-like peptide-1 (GLP-1) receptor agonists, may have benefits on cognitive function has been proposed and is being studied. See, e.g., G D Femminella, et al., *Evaluating the effects of the novel GLP-1 analogue liraglutide in Alzheimer's disease: study protocol for a randomized controlled trial (ELAD study)*, 20 TRIALS 191 (2019). There remains a need, however, for therapies to treat, prevent or delay cognitive decline, cognitive impairment or dementia, including in patients with T2DM.

Patients with type 2 diabetes mellitis (T2DM) are at risk for Heart Failure with preserved ejection fraction (HFpEF) as well as Heart Failure with reduced ejection fraction (HFrEF). See, e.g., J. Ho, et al., *Predictors of New-Onset Heart Failure*; Circulation: Heart Failure 6:279-286 (2013). Current treatments for HFpEF may include lifestyle modification to induce weight loss and administration of agents for symptom relief of co-morbid conditions. Bariatric surgery showed some benefit in patients with HFpEF. See, e.g., Mikhalkova, et al., Obesity (2018). Despite the increasing incidence of HFpEF, effective treatment options have been largely unsuccessful. See, e.g., Zheng et. al., *Drug treatment effects on outcomes in heart failure with preserved ejection fraction: a systematic review and meta-analysis, Heart.* 104 (5): 407-415 (March 2018). There is currently no approved pharmaceutical treatment for HFpEF. There is a need for therapies to treat, prevent or delay HFpEF. There is a need for therapies to treat, prevent, or delay HFrEF.

The present invention provides methods for treating, preventing or delaying cognitive disorders, such as cognitive decline, cognitive impairment or dementia.

Accordingly, the present invention provides a method of treating, preventing or delaying development of a cognitive disorder in a patient, comprising administering tirzepatide in a therapeutically effective amount to the patient once weekly.

In another aspect, the present invention provides a method of preventing or delaying cognitive decline in a patient, comprising administering tirzepatide in a therapeutically effective amount to the patient once weekly.

In another aspect, the present invention provides a method of improving glycemic control and treating, preventing or delaying cognitive decline in a patient in a patient with type 2 diabetes mellitus, comprising administering tirzepatide in a therapeutically effective amount to the patient once weekly.

In another aspect, the present invention provides a method of improving glycemic control in a patient with type 2 diabetes mellitus and at risk for cognitive decline, comprising administering tirzepatide in a therapeutically effective amount to the patient once weekly, wherein the method provides a reduction in the risk of the patient experiencing cognitive decline.

In another aspect, the present invention provides tirzepatide for use in treating, preventing or delaying development of a cognitive disorder in a patient, comprising administering tirzepatide in a therapeutically effective amount to the patient once weekly.

In another aspect, the present invention provides use of tirzepatide for the preparation of a medicament for treating, preventing or delaying development of a cognitive disorder in a patient, comprising administering tirzepatide in a therapeutically effective amount to the patient once weekly.

The present invention provides methods for treating, preventing or delaying heart failure, comprising administering an effective amount of tirzepatide, or a pharmaceutically acceptable salt thereof to a patient in need of such treatment.

Accordingly, the present invention provides a method of treating, preventing or delaying development of a HFpEF in a patient, comprising administering an effective amount of tirzepatide, or a pharmaceutically acceptable salt thereof, to the patient once weekly.

Accordingly, the present invention provides a method of treating, preventing or delaying development of a HFrEF in a patient, comprising administering an effective amount of tirzepatide, or a pharmaceutically acceptable salt thereof, to the patient once weekly.

In another aspect, the present invention provides a method of preventing or delaying HFpEF in a patient, comprising administering an effective amount of tirzepatide, or a pharmaceutically acceptable salt thereof, to the patient once weekly.

In another aspect, the present invention provides a method of preventing or delaying HFrEF in a patient, comprising administering an effective amount of tirzepatide, or a pharmaceutically acceptable salt thereof, to the patient once weekly.

In another aspect, the present invention provides a method of improving glycemic control and treating, preventing or delaying HFpEF in a patient in a patient with type 2 diabetes mellitus, comprising administering an effective amount of tirzepatide, or a pharmaceutically acceptable salt thereof, to the patient once weekly.

In another aspect, the present invention provides a method of improving glycemic control and treating, preventing or delaying HFrEF in a patient in a patient with type 2 diabetes mellitus, comprising administering an effective amount of tirzepatide, or a pharmaceutically acceptable salt thereof, to the patient once weekly.

In another aspect, the present invention provides a method of improving glycemic control in a patient with type 2 diabetes mellitus and at risk for HFpEF, comprising administering an effective amount of tirzepatide, or a pharmaceutically acceptable salt thereof, to the patient once weekly, wherein the method provides a reduction in the risk of the patient experiencing HFpEF.

In another aspect, the present invention provides a method of improving glycemic control in a patient with type 2 diabetes mellitus and at risk for HFrEF, comprising administering an effective amount of tirzepatide, or a pharmaceutically acceptable salt thereof, to the patient once weekly, wherein the method provides a reduction in the risk of the patient experiencing HFrEF.

In another aspect, the present invention provides a method of improving weight management in a patient with obesity and at risk for HFpEF, comprising administering an effective amount of tirzepatide, or a pharmaceutically acceptable salt thereof, to the patient once weekly, wherein the method provides a reduction in the risk of the patient experiencing HFpEF.

In another aspect, the present invention provides a method for treating HFpEF in patient at risk for HFpEF, comprising administering an effective amount of tirzepatide, or a pharmaceutically acceptable salt thereof, to the patient once weekly, wherein the patient's weight is within a normal weight range for the patient.

In another aspect, the present invention provides a method of improving weight management in a patient with obesity and at risk for HFrEF, comprising administering an effective amount of tirzepatide, or a pharmaceutically acceptable salt thereof, to the patient once weekly, wherein the method provides a reduction in the risk of the patient experiencing HFrEF.

In another aspect, the present invention provides tirzepatide, or a pharmaceutically acceptable salt thereof, for use in treating, preventing or delaying development of HFpEF in a patient, comprising administering an effective amount of tirzepatide to the patient once weekly.

In another aspect, the present invention provides tirzepatide, or a pharmaceutically acceptable salt thereof, for use in treating, preventing or delaying development of HFrEF in a patient, comprising administering an effective amount of tirzepatide to the patient once weekly.

In another aspect, the present invention provides use of tirzepatide, or a pharmaceutically acceptable salt thereof, for the preparation of a medicament for treating, preventing or delaying development of HFpEF in a patient, comprising administering tirzepatide in a therapeutically effective amount to the patient once weekly.

In another aspect, the present invention provides use of tirzepatide for the preparation of a medicament for treating, preventing or delaying development of HFrEF in a patient, comprising administering tirzepatide, or a pharmaceutically acceptable salt thereof, in a therapeutically effective amount to the patient once weekly.

U.S. Pat. No. 9,474,780 describes and claims tirzepatide. When used herein, the term "tirzepatide" refers to any GIP/GLP-1 receptor agonist having the amino acid sequence of SEQ ID NO:1, including any protein that is the subject of a regulatory submission seeking approval of a GIP/GLP-1 receptor agonist product which relies in whole or part upon data submitted to a regulatory agency by Eli Lilly and Company relating to tirzepatide, regardless of whether the party seeking approval of said protein actually identifies the protein as tirzepatide or uses some other term. Tirzepatide agonizes the GIP/GLP-1 receptors resulting in stimulation of insulin synthesis and secretion, and has been shown to provide improved glycemic control in T2DM patients.

Cognitive Decline.

The development or progression of cognitive decline may be reflected in scores generated through administration of measures of cognitive status, such as the Montreal Cognitive Assessment (MoCA) and the Digit Symbol Substitution Test (DSST).

The MOCA is a cognitive screening test that has been validated in the setting of mild cognitive impairment and subsequently adopted in numerous clinical settings. The test comprises a 1-page 30-item questionnaire designed to be administered in approximately 10 minutes in the participant's first language using a validated translation. It assesses seven cognitive domains including short-term memory, visuospatial abilities, executive function, attention, concentration, working memory and language. See, e.g., Nasreddine Z S, et al. *The Montreal Cognitive Assessment, MoCA: a brief screening tool for mild cognitive impairment*. J. AM. GERIATR. SOC. 2005; 53(4): 695-9; Pendlebury S T, et al., *Underestimation of cognitive impairment by Mini-Mental State Examination versus the Montreal Cognitive Assessment inpatients with transient ischemic attack and stroke: a population-based study*. STROKE 2010; 41(6): 1290-3. The MOCA score is equal to the number of items out of 30 answered correctly, plus 1 extra point if the individual reports ≤12 years of education. Controlled validation studies in cognitively normal individuals have reported a mean MOCA score of 27.4 with a standard deviation of 2.2. However, population-based studies of presumably cognitively intact people report much lower mean scores. See, e.g., Rossetti H C, et al., *Normative data for the Montreal Cognitive Assessment (MoCA) in a population-based sample*. NEUROLOGY 2011; 77(13): 1272-5.

The DSST is a subtest of the Wechsler Adult Intelligence Scale (3rd Edition) and assesses a wide array of cognitive domains including visual-motor speed and coordination, capacity for learning, attention, concentration and short-term memory. See Wechsler D, *Manual for the Wechsler Adult Intelligence scale*. NY, NY. (1955); D W. *The Wechsler Adult Intelligence Scale-Revised. NY, NY. The Psychological Corporation* (1981). It consists of rows of 9 randomly ordered symbols with a blank square underneath, and a key at the top of the page that pairs each symbol to a number. Respondents fill the blank space under each symbol with the corresponding number as quickly as possible over a 2-minute period. The score is the number of consecutive digit-symbol pairs correctly completed within 2 minutes, and the maximum possible score is 135. It has been extensively used to measure cognitive function in cognitively intact individuals with and without diabetes, and validation studies have demonstrated that it predicts future cognitive dysfunction and disability; is relatively easy to administer; is not language specific; and its score is correlated with measures of physical function and future cognitive decline. See, e.g., Rosano C, et al., *Association Between Lower Digit Symbol Substitution Test Score and Slower Gait and Greater Risk of Mortality and of Developing Incident Disability in Well-Functioning Older Adults*, J. AM. GERIATR. SOC. (2008); Knopman D, et al., *Cardiovascular risk factors and cognitive decline in middle-aged adults*. NEUROLOGY. 56(1):42-8 (2001). When the DSST was used in randomized controlled trials involving cognitively intact people with dysglycemia, mean baseline scores ranged from 36 to 52. See Cukierman-Yaffe T, et al., *Effects of basal insulin glargine and omega-3fatty acid on cognitive decline and probable cognitive impairment in people with dysglycaemia: a substudy of the ORIGIN trial*. THE LANCET DIABETES & ENDOCRINOLOGY 2014; 2(7): 562-72; Launer L J, et al. *Effects of intensive glucose lowering on brain structure and function in people with type 2 diabetes (ACCORD MIND): a randomised open-label substudy*. LANCET NEUROL. (2011); 10(11): 969-77.

Previous studies have suggested that the normal range of cognitive tests scores may differ by country. Rossetti H C, et al., *Normative data for the Montreal Cognitive Assessment (MoCA) in a population-based sample*. NEUROLOGY 2011; 77(13): 1272-5; Thomann A E, et al. *The Montreal Cognitive Assessment: Normative Data from a German-Speaking Cohort and Comparison with International Normative Samples*. J. ALZHEIMER'S DIS. 2018; 64(2): 643-55. Thus, when assessing substantive decline in populations that include individuals from multiple countries, it may be desirable to standardize each individual's score at each time-point to a mean baseline score and standard deviation of the values achieved within his or her country, as opposed to the mean and standard deviation of the entire population.

Previous studies have also noted that cognitive test scores decline very slowly with time in groups of middle-aged individuals, but that some individuals experience faster decline than others. See Cukierman-Yaffe T, et al. *Effects of basal insulin glargine and omega-3 fatty acid on cognitive decline and probable cognitive impairment in people with dysglycaemia: a substudy of the ORIGIN trial*. THE LANCET DIABETES & ENDOCRINOLOGY 2014; 2(7): 562-72; Proust-Lima C, et al., *Sensitivity of four psychometric tests to measure cognitive changes in brain aging-population-based studies*. AM. J. EPIDEMIOL. 2007; 165(3): 344-50. These and other studies support the use of a threshold-based definition of decline by 1.5 standard deviations or greater from baseline. See also Group S R, et al. *Effect of Intensive vs Standard Blood Pressure Control on Probable Dementia: A Randomized Clinical Trial*. JAMA 2019; 321(6): 553-61; Group S R. *A Randomized Trial of Intensive versus Standard Blood-Pressure Control*. N. ENGL. J. MED. 2015; Biessels G J, et al. *Rationale and design of the CAROLINA®—cognition substudy: a randomised controlled trial on cognitive outcomes of linagliptin versus glimepiride inpatients with type 2 diabetes mellitus*. BMC NEUROL. 2018; 18(1): 7.

When used herein, the term "cognitive disorder" refers to any condition involving impairments in a person's cognitive function, such as difficulties with memory, learning new things, ability to concentrate and/or decision-making that affects the person's everyday life. Such impairment ranges from mild cognitive impairment (MCI) to mild, moderate and severe dementia. MCI refers to a stage of cognitive impairment between the expected cognitive changes consistent with aging and mild dementia, and may be characterized by a slight but noticeable and measurable decline in cognitive abilities, including memory and thinking skills, but without loss in ability to undertake everyday activities. More severe impairment, or dementia, is associated with losses in ability to perform everyday activities, and depending on the severity, the abilities to read, write, and/or understand meaning or significance of things.

The methods provided herein may be most effective in patients at relatively higher risk for experiencing cognitive decline. In certain embodiments, such patients are those having one or more of: T2DM; hypertension; elevated cholesterol and/or obesity.

In certain embodiments, such patients have established cardiovascular disease; and/or one or more risk factors for major adverse cardiovascular events.

Heart Failure.

Heart failure with preserved ejection fraction (HFpEF) is a form of heart failure in which the ejection fraction—the percentage of the volume of blood ejected from the left ventricle with each heartbeat divided by the volume of blood when the left ventricle is maximally filled—is normal, defined as greater than 50%. Despite an increased incidence of HFpEF, efforts to effectively treat HFpEF have been largely unsuccessful.

Conventionally, heart failure has been treated with a variety of drugs to treat the comorbid symptoms. Such treatments include alpha-adrenergic agonists, beta-adrenergic agonists, calcium channel antagonists, cardiac glycosides, diuretics, nitrates, phosphodiesterase inhibitors, prazosin, and a variety of vasodilators. These treatments are associated with undesired side effects. For example, alpha-adrenergic agonists may be associated with edema of the peripheral tissues. Certain treatments are associated with desensitization to the drug, rendering the treatment ineffective. There is a continued demand for a treatment for HFpEF with an acceptable pharmaceutical side effect profile. Further, the is a demand for a treatment for HFrEF with an acceptable pharmaceutical side effect profile.

When used herein, the term "substantive cognitive decline" or "SCD" refers to a significant decrease in a subject's score in a standardized cognitive assessment, such as MoCA or DSST of 1.5 standard deviations or greater.

When used herein, the terms "country-standardization," "country-standardized," and the like, refer to normalization of cognitive function scores by: calculating the baseline mean and standard deviation of the scores within each country; and using these baseline mean and standard deviations to calculate a standardized MOCA and DSST score for each participant at each time point by subtracting the country-specific baseline mean score from each individual's score at that time point and dividing the difference by the country-specific baseline standard deviation.

When used herein, the term "major adverse cardiovascular events" refers to cardiovascular death, non-fatal myocardial infarction and non-fatal stroke. These events are also sometimes referred to as MACE or MACE 3 events. The first to occur of any of these events is a composite endpoint frequently used in CVOTs.

When used herein in relation to major adverse cardiovascular events, the term "risk factors" refers to characteristics of T2DM patients understood to increase their risk for a major adverse cardiovascular event. Such risk factors include in particular any of the following: current tobacco use (any form of tobacco); use of at least 1 approved lipid modifying therapy (e.g., statins such as atorvastatin, rosuvastatin, simvastatin, pravastatin, lovastatin, fluvastatin or pitavastatin; PCSK9 inhibitors, such as evolocumab or alirocumab; and ezetimibe) to treat hypercholesterolemia or a documented untreated low-density lipoprotein cholesterol (LDL-C)≥3.4 mmol/L (130 mg/dL) within the past 6 months; documented treated or untreated high-density lipoprotein cholesterol (HDL-C) <1.0 mmol/L (40 mg/dL) for men and <1.3 mmol/L (50 mg/dL) for women or triglycerides ≥2.3 mmol/L (200 mg/dL) within the past 6 months; use of at least 1 blood pressure medication to treat hypertension (e.g., angiotensin converting enzyme (ACE) inhibitors, angiotensin receptor blockers (ARBs), thiazide like diuretics, and dihydropyridine calcium channel blockers) or untreated systolic blood pressure (SBP) ≥140 mm Hg or diastolic blood pressure (DBP) ≥95 mmHg; measured waist-to-hip ratio >1.0 for men and >0.8 for women.

As used herein "improved weight management" means that the patient weight is within or closer to the clinically defined normal weight range for the patient. "Normal weight" for a particular patient may be determined by a clinician considering applicable considerations that are well known to the skilled clinician. Typically, improved weight management means that the patient loses weight to reach a weight that is within, or closer to, the desired weight range for the patient. As used herein "normal weight range" shall be a weight that a skilled clinician determines to be the normal weight for a particular patient. The normal weight range may vary based on the height of the patient and other factors considered by the skilled clinician in weight assessment.

When used herein, the terms "treatment," "treat," "treating," and the like, are meant to include slowing or attenuating the progression of a disease, condition or disorder. These terms also include alleviating, ameliorating, attenuating, eliminating, or reducing one or more symptoms of a disorder or condition, even if the disorder or condition is not actually eliminated and even if progression of the disorder or condition is not itself slowed or reversed. When used herein, the terms "prevent," "preventing," "prevention," and the like, are meant to include avoidance of the onset of a disease, condition, disorder or symptom. When used herein, the terms "delay," "delaying," and the like, are meant to include increasing the duration of time that occurs until onset of a disease, condition, disorder or symptom.

When used herein in connection with multiple outcomes, the term "composite" refers to the first to occur of any of the outcomes.

When used herein, the term "hazard ratio" refers to a measure of the relative rate of progression to an endpoint as compared to a control group. In outcome-based clinical trials, a reduction in the hazard ratio for a test arm as compared to the control indicates the therapy used in the test arm reduces the risk of the endpoint, in the case of the studies described herein, major adverse cardiovascular events.

"Therapeutically effective amount" means the amount of tirzepatide for the methods and uses of the present invention or pharmaceutical composition comprising tirzepatide for the methods and uses of the present invention that will elicit the biological or medical response of or desired therapeutic effect on the patient that is being sought by the researcher, medical doctor, or other clinician. An effective amount of tirzepatide may vary according to factors such as the disease state, age, sex, and weight of the individual, and the ability of tirzepatide to elicit a desired response in the individual. An effective amount is also one in which any toxic or detrimental effect is outweighed by the therapeutically beneficial effects. In certain embodiments, the therapeutically effective amount of tirzepatide for use in the methods described herein is selected from the group consisting of 5, 10 and 15 mg. In certain embodiments, the therapeutically effective amount of tirzepatide is 5.0 mg. In certain embodiments, the therapeutically effective amount of tirzepatide is 10.0 mg. In preferred embodiments, the therapeutically effective amount of tirzepatide is 15.0 mg.

Additional embodiments of the present invention are described below:

Cognitive Disorder

A method of treating, preventing or delaying development of a cognitive disorder in a patient, comprising administering tirzepatide, or a pharmaceutically acceptable salt thereof, in a therapeutically effective amount to the patient once weekly. In an embodiment, the cognitive disorder is selected from the group consisting of MCI and dementia.

A method of preventing or delaying cognitive decline in a patient, comprising administering tirzepatide, or a pharmaceutically acceptable salt thereof, in a therapeutically effective amount to the patient once weekly.

A method of improving glycemic control and treating, preventing or delaying cognitive decline in a patient in a patient with type 2 diabetes mellitus, comprising administering tirzepatide, or a pharmaceutically acceptable salt thereof, in a therapeutically effective amount to the patient once weekly.

In an embodiment, the method results in a reduction in the risk of the patient experiencing cognitive decline.

A method of improving glycemic control in a patient with type 2 diabetes mellitus, comprising administering tirzepatide, or a pharmaceutically acceptable salt thereof, in a therapeutically effective amount to the patient once weekly, wherein the method results in a reduction in the risk of the patient experiencing cognitive decline.

The method of any of the above embodiments wherein the patient has type 2 diabetes mellitus.

The method of any of the above embodiments wherein the patient has one or more of: T2DM; hypertension; elevated cholesterol and obesity.

In an embodiment, the patient has either: multiple cardiovascular risk factors without established cardiovascular disease; or established cardiovascular disease.

In an embodiment, the risk factors for cardiovascular disease are selected from the group consisting of: current tobacco use (any form of tobacco); use of at least 1 approved lipid modifying therapy to treat hypercholesterolemia or a documented untreated low-density lipoprotein cholesterol (LDL-C) ≥3.4 mmol/L (130 mg/dL) within the past 6 months; documented treated or untreated high-density lipoprotein cholesterol (HDL-C) <1.0 mmol/L (40 mg/dL) for men and <1.3 mmol/L (50 mg/dL) for women or triglycerides ≥2.3 mmol/L (200 mg/dL) within the past 6 months; use of at least 1 blood pressure medication to treat hypertension or untreated systolic blood pressure (SBP) ≥140 mm Hg or diastolic blood pressure (DBP) ≥95 mmHg; measured waist-to-hip ratio >1.0 for men and >0.8 for women.

In an embodiment, the cognitive disorder is selected from the group consisting of MCI and dementia.

In an embodiment, the patient's risk of cognitive decline is reduced by at least about 14%.

In an embodiment, the risk of a major adverse cardiovascular event is reduced by at least about 10%.

In an embodiment, the risk of a major adverse cardiovascular event is reduced by at least about 11%.

In an embodiment, the risk of a major adverse cardiovascular event is reduced by about 12%.

In an embodiment, the risk of the occurrence of a composite of the following outcomes is reduced: cognitive decline or death.

In an embodiment, the risk of the occurrence of a composite of the following outcomes is reduced: cognitive decline or stroke.

In an embodiment, the risk of the occurrence of a composite of the following outcomes is reduced: cognitive decline, stroke or transient ischemic attack.

In an embodiment, the risk of the occurrence of a composite of the following outcomes is reduced: cognitive decline, stroke, transient ischemic attack or death.

In an embodiment, the risk of cardiovascular death is lower.

In an embodiment, the risk of non-fatal stroke is lower.

In an embodiment, the risk of non-fatal myocardial infarction is lower.

In an embodiment, the risk of the occurrence of a composite of the following outcomes is reduced: diabetic retinopathy needing laser, anti-VEGF therapy, or vitrectomy; clinical proteinuria; a 30% decline in eGFR; or chronic renal replacement therapy.

A method of treating, preventing or delaying development of a cognitive disorder in a patient, comprising administering tirzepatide, or a pharmaceutically acceptable salt thereof, in a therapeutically effective amount to the patient once weekly. In an embodiment, the cognitive disorder is selected from the group consisting of MCI and dementia.

In an embodiment, the amount of tirzepatide is selected from the group consisting of about 5.0 mg, about 10.0 mg and about 15.0 mg.

In an embodiment, the amount of tirzepatide is about 5.0 mg.

In an embodiment, the amount of tirzepatide is about 10.0 mg.

In an embodiment, the amount of tirzepatide is about 15.0 mg.

In an embodiment, once weekly administration of tirzepatide, or a pharmaceutically acceptable salt thereof, is continued for at least 2 years.

In an embodiment, once weekly administration of tirzepatide, or a pharmaceutically acceptable salt thereof, is continued for at least 3 years.

In an embodiment, once weekly administration of tirzepatide, or a pharmaceutically acceptable salt thereof, is continued for at least 4 years.

In an embodiment, once weekly administration of tirzepatide, or a pharmaceutically acceptable salt thereof, is continued for approximately 5 years.

In an embodiment, once weekly administration of tirzepatide, or a pharmaceutically acceptable salt thereof, is continued for at least 5.4 years.

In an embodiment, tirzepatide, or a pharmaceutically acceptable salt thereof, is administered using a dose escalation protocol.

In an embodiment, the patient is also administered the standard of care for reducing the risk of major adverse cardiovascular events.

In an embodiment, the patient is also administered the maximum tolerated dose of an ACE inhibitor.

In an embodiment, the patient is also administered the maximum tolerated dose of an ARB.

In an embodiment, the patient is also administered a beta blocker.

In an embodiment, the patient is also administered a calcium channel blocker.

In an embodiment, the patient is also administered a diuretic.

In an embodiment, the patient is also administered an antithrombotic agent.

In an embodiment, the patient is also administered aspirin.

In an embodiment, the patient is also administered a statin.

Tirzepatide, or a pharmaceutically acceptable salt thereof, for use in any of the above embodiments.

Use of tirzepatide, or a pharmaceutically acceptable salt thereof, in the preparation of a medicament for any of the above embodiments.

Heart Failure

A method of treating, preventing or delaying development of heart failure in a patient, comprising administering tirzepatide, or a pharmaceutically acceptable salt thereof, in a therapeutically effective amount to the patient once weekly. In an embodiment, the heart failure is selected from the group consisting of HFpEF and HFrEF.

A method of preventing or delaying heart failure in a patient, comprising administering tirzepatide, or a pharmaceutically acceptable salt thereof, in a therapeutically effective amount to the patient once weekly.

A method of improving glycemic control and treating, preventing or delaying heart failure in a patient in a patient with type 2 diabetes mellitus, comprising administering tirzepatide, or a pharmaceutically acceptable salt thereof, in a therapeutically effective amount to the patient once weekly.

In an embodiment, the method results in a reduction in the risk of the patient experiencing HFpEF. In an embodiment, the method results in a reduction in the risk of the patient experiencing HFrEF.

A method of improving glycemic control in a patient with type 2 diabetes mellitus, comprising administering tirzepatide, or a pharmaceutically acceptable salt thereof, in a therapeutically effective amount to the patient once weekly, wherein the method results in a reduction in the risk of the patient experiencing cognitive decline.

The method of any of the above embodiments wherein the patient has type 2 diabetes mellitus.

The method of any of the above embodiments wherein the patient has one or more of: T2DM; hypertension; elevated cholesterol and obesity.

In an embodiment, the patient has either: multiple cardiovascular risk factors without established cardiovascular disease; or established cardiovascular disease.

In an embodiment, the risk factors for cardiovascular disease are selected from the group consisting of: current tobacco use (any form of tobacco); use of at least 1 approved lipid modifying therapy to treat hypercholesterolemia or a documented untreated low-density lipoprotein cholesterol (LDL-C) ≥3.4 mmol/L (130 mg/dL) within the past 6 months; documented treated or untreated high-density lipoprotein cholesterol (HDL-C) <1.0 mmol/L (40 mg/dL) for men and <1.3 mmol/L (50 mg/dL) for women or triglycerides ≥2.3 mmol/L (200 mg/dL) within the past 6 months; use of at least 1 blood pressure medication to treat hypertension or untreated systolic blood pressure (SBP) ≥140 mm Hg or diastolic blood pressure (DBP) ≥95 mmHg; measured waist-to-hip ratio >1.0 for men and >0.8 for women.

In an embodiment, the heart failure is selected from the group consisting of HFpEF and HFrEF.

In an embodiment, the patient's six minute walk test is improved. In an embodiment the patient's six minute walk test demonstrates improved exercise capacity.

In an embodiment, the patient's Kansas City Cardiomyopathy Questionnaire Clinical Summary Score (KCCQ-CSS) improves. In an embodiment, the improved KCCQ-CSS correlates with a net clinical benefit.

In an embodiment, the patient's risk of heart failure is reduced by at least about 14%.

In an embodiment, the risk of heart failure is reduced by at least about 10%.

In an embodiment, Pro-C3 inflammation markers are reduced. In an embodiment, Pro-C3 inflammation markers are reduced to a clinically desired level.

In an embodiment, the CRP levels are reduced. In an embodiment, CRP levels are reduced to a clinically desired level.

In an embodiment, the risk of the occurrence of a composite of the following outcomes is reduced: hospitalization for HFpEF or death.

In an embodiment, the risk of death or hospitalization for HFpEF is reduced in a patient treated with an effective amount of tirzepatide, or a pharmaceutically acceptable salt thereof.

In an embodiment, the risk of the occurrence of a composite of the following outcomes is reduced: HFpEF or cognitive decline.

In an embodiment, the risk of the occurrence of a composite of the following outcomes is reduced: cognitive decline, HFpEF or HFrEF.

In an embodiment, the risk of the occurrence of a composite of the following outcomes is reduced: cognitive decline, HFpEF, or death.

A method of treating, preventing or delaying development of a heart failure in a patient, comprising administering tirzepatide, or a pharmaceutically acceptable salt thereof, in a therapeutically effective amount to the patient once weekly. In an embodiment, the heart failure is selected from the group consisting of HFpEF and HFrEF.

In an embodiment, the amount of tirzepatide is selected from the group consisting of about 5.0 mg, about 10.0 mg and about 15.0 mg.

In an embodiment, the amount of tirzepatide is about 5.0 mg.

In an embodiment, the amount of tirzepatide is about 10.0 mg.

In an embodiment, the amount of tirzepatide is about 15.0 mg.

In an embodiment, the patient is at least 50 years old. In an embodiment, the patient is at least 65 years old.

In an embodiment, once weekly administration of tirzepatide is continued for at least 2 years.

In an embodiment, once weekly administration of tirzepatide is continued for at least 3 years.

In an embodiment, once weekly administration of tirzepatide is continued for at least 4 years.

In an embodiment, once weekly administration of tirzepatide is continued for approximately 5 years.

In an embodiment, once weekly administration of tirzepatide is continued for at least 5.5 years.

In an embodiment, tirzepatide, or a pharmaceutically acceptable salt thereof, is administered using a dose escalation protocol.

In an embodiment, the patient is also administered the standard of care for reducing the risk of major adverse cardiovascular events.

In an embodiment, the patient is also administered the standard of care for treating the symptoms of conditions comorbid with HFrEF.

In an embodiment, the patient is also administered the maximum tolerated dose of an ACE inhibitor.

In an embodiment, the patient is also administered the maximum tolerated dose of an ARB.

In an embodiment, the patient is also administered a beta blocker.

In an embodiment, the patient is also administered a calcium channel blocker.

In an embodiment, the patient is also administered a diuretic.

In an embodiment, the patient is also administered an antithrombotic agent.

In an embodiment, the patient is also administered aspirin.

In an embodiment, the patient is also administered a statin.

Tirzepatide, or a pharmaceutically acceptable salt thereof, for use in any of the above embodiments.

Use of tirzepatide, or a pharmaceutically acceptable salt thereof, in the preparation of a medicament for any of the above embodiments.

Further embodiments are described in the examples below, which are not to be construed as limiting.

EXAMPLES

The enrollment criteria, set forth in Table 1 below, are designed to include participants who are similar to patients seen within a typical diabetes practice, who have varying cardiovascular risk factors or established cardiovascular disease:

TABLE 1

Enrollment Criteria.
Key inclusion criteria

T2DM with HbA1c ≤9.5%
Stable dose of 0, 1 or 2 oral glucose-lowering drugs ± basal insulin for ≥3 months
BMI ≥3 kg/m$^2$
If age ≥50 years, at least 1 of: prior MI; prior ischaemic stroke; coronary revascularization ≥2 years earlier; carotid or peripheral revascularization ≥2 months earlier; unstable angina hospitalization; image proven myocardial ischaemia; or percutaneous coronary intervention
If age ≥55 years, any of the above or at least 1 of: documented myocardial ischaemia by stress test or imaging; >50% coronary, carotid or lower extremity artery stenosis; ankle-brachial index <0.9; eGFR persistently <60 mL/min/1.73 m2; hypertension with left ventricular hypertrophy; or persistent albuminuria
If age ≥60 years, any of the above or at least 2 of: any tobacco use; use of lipid-modifying therapy or a documented untreated LDL cholesterol ≥3.4 mmol/L (130 mg/dL) within the past 6 months; HDL cholesterol <1.0 mmol/L (40 mg/dL) for men and <1.3 mmol/L (50 mg/dL) for women or triglycerides ≥2.3 mmol/L (200 mg/dL) within the past 6 months; use of ≥1 blood pressure drug or untreated systolic blood pressure ≥140 mm Hg or diastolic blood pressure ≥95 mm Hg; or waist-to-hip ratio >1.0 (men) and >0.8 (women)
Run-in adherence to study drug = 100%
Signed informed consent The study is designed to consist of a screening visit followed by a single-blind 3-week placebo run-in period. Afterwards, patients are randomized to either tirzepatide 5, 10, or 15 mg (dosed using an escalation dose protocol) or placebo and followed at approximately 6-month intervals. Patients are followed until approximately 1200 patients experience a primary endpoint event, adjudicated as such.

Analyses include assessment of the effects of tirzepatide on cognitive decline, as measured through administration of 2 different cognitive instruments—MOCA and DSST—at baseline and at the 2-year, 5-year and end-of-study visits. The MOCA and DSST methods are described in more detail above.

The primary cognitive outcome is country-standardized substantive cognitive decline (SCD), which is defined as a reduction of either the MOCA or DSST score of ≥1.5 standard deviations from the individual's baseline score. Country-standardization is accomplished by first calculating the baseline mean and standard deviation of the MOCA and DSST score within each country. These baseline mean and standard deviations are used to calculate a standardized MOCA and DSST score for each participant at each time point. This is done by subtracting the country-specific baseline mean score from the individual's score at that time point and dividing the difference by the country specific baseline standard deviation. Additional cognitive outcomes include composites of SCD with death, stroke, stroke or TIA, and stroke, TIA or death, and the change in standardized MOCA and DSST scores over time.

Cognitive analyses are restricted to participants who have a baseline MOCA or DSST score and at least 1 follow-up score of the same type.

Continuous variables are summarized using means with standard deviations and binary variables are summarized using counts with percentages. Cox proportional hazard models are used to estimate the hazard of SCD and SCD-based composite outcomes with tirzepatide versus placebo, both before and after accounting for each individual's baseline standardized MOCA and DSST scores. Sensitivity of the Cox model to the discrete nature of the results due to the intermittent administration of the cognitive tests is assessed by repeating the main analyses using a discrete time proportional odds logistic model. Where indicated, Cox models account for the competing risk of death. See Fine J P, Gray R J. A proportional hazards model for the subdistribution of a competing risk. *Journal of the American Statistical Association* 1999; 94: 496-509. Differences for effects within subgroups are explored by including the subgroup, and a subgroup-treatment interaction term in the model. Finally, repeated measures linear mixed-effects models estimate the effect of tirzepatide on the least square mean difference in the standardized MOCA and DSST scores, with the standardized baseline scores as covariates, participant as a random effect, and fixed effects for treatment, visit, and treatment-visit interaction. See Senn S. Change from baseline and analysis of covariance revisited. *Stat Med* 2006; 25(24): 4334-44.

Statistical analyses are completed using SAS software.

Example 2

A 52-week Phase 3 maximum tolerated dose, up to 15 mg/week, six-minute walk test ("6MWT") study in patients with obesity and HFpEF is conducted. A sample size of 500 patients are randomized 1:1 with placebo and tirzepatide (maximum tolerated dose up to 15 mg/week). The study will measure the 6MWT, weight loss, Kansas City Cardiomyopathy Questionnaire ("KCCQ"), Churg-Strauss Syndrome ("CSS"), left atrial volume index ("LAVI"), ectopic atrial tachycardia ("EAT"), and magnetic resonance imaging ("MRI") measures of interest, including, for example, left ventricle ("LV") strain, LV mass index.

Example 3

In a Phase 2 study (GPGB), tirzepatide patients receiving 15 mg/week tirzepatide show improvement in C-Reactive Protein ("CRP"), vascular cell adhesion molecule 1 ("VCAM-1"), and intercellular adhesion molecule-1 ("ICAM-1"). Plasma collagen type III ("Pro-C3") biomarker improvement is observed in the 10 mg/week and 15 mg/week patient groups.

Sequences

```
Tirzepatide
                                            SEQ ID NO: 1
YX₁EGTFTSDYSIX₂LDKIAQKAFVQWLIAGGPSSGAPPPS
``` wherein $X_1$ is Aib; $X_2$ is Aib; K at position 20 is chemically modified through conjugation to the epsilon-amino group of the K side-chain with (2-[2-(2-Amino-ethoxy)-ethoxy]-acetyl)$_2$-(γGlu)$_1$-CO—(CH$_2$)$_{18}$—CO$_2$H; and the C-terminal amino acid is amidated as a C-terminal primary amide.

We claim:

1. A method of treating heart failure with preserved ejection fraction (HFpEF) in a patient with obesity, comprising administering an effective amount of tirzepatide, or a pharmaceutically acceptable salt thereof, to the patient once weekly.

2. The method of claim 1, wherein the patient's risk of the occurrence of a composite of the following outcomes is reduced: cognitive decline, hospitalization for HFpEF, or death.

3. The method of claim 1 wherein the therapeutically effective amount of tirzepatide is selected from the group consisting of about 5.0 mg, about 10.0 mg and about 15.0 mg.

4. The method of claim 1, wherein the therapeutically effective amount of tirzepatide is about 15.0 mg.

5. The method of claim 1 wherein once weekly administration of tirzepatide is continued for at least 2 years.

6. The method of claim 1, wherein the therapeutically effective amount of tirzepatide is about 5.0 mg.

7. The method of claim 1, wherein the therapeutically effective amount of tirzepatide is about 10.0 mg.

8. The method of claim 1, wherein the patient has type 2 diabetes mellitus.

* * * * *

SEQUENCE LISTING

```
<160> NUMBER OF SEQ ID NOS: 1

<210> SEQ ID NO 1
<211> LENGTH: 39
<212> TYPE: PRT
<213> ORGANISM: Artificial Sequence
<220> FEATURE:
<223> OTHER INFORMATION: Synthetic Construct
<220> FEATURE:
<221> NAME/KEY: MISC_FEATURE
<222> LOCATION: (2)..(2)
<223> OTHER INFORMATION: Xaa at position 2 is nonnaturally occurring
      amino acid 2-Aminoisobutyric Acid
<220> FEATURE:
<221> NAME/KEY: MISC_FEATURE
<222> LOCATION: (13)..(13)
<223> OTHER INFORMATION: Xaa at position 13 is nonnaturally occurring
      amino acid 2-Aminoisobutyric Acid
<220> FEATURE:
<221> NAME/KEY: MOD_RES
<222> LOCATION: (20)..(20)
<223> OTHER INFORMATION: Lys at position 20 is chemically modified
      through conjugation to the epsilon-amino group of the K side-chain
      with (2-[2-(2-Amino-ethoxy)-ethoxy]-acetyl)2-(gamma-Glu)1-CO-
      (CH2)18-CO2H
<220> FEATURE:
<221> NAME/KEY: MOD_RES
<222> LOCATION: (39)..(39)
<223> OTHER INFORMATION: Ser at position 39 is amidated as a C-terminal
      primary amide

<400> SEQUENCE: 1

Tyr Xaa Glu Gly Thr Phe Thr Ser Asp Tyr Ser Ile Xaa Leu Asp Lys
1               5                   10                  15

Ile Ala Gln Lys Ala Phe Val Gln Trp Leu Ile Ala Gly Gly Pro Ser
            20                  25                  30

Ser Gly Ala Pro Pro Pro Ser
        35
```